(12) United States Patent
Griffith

(10) Patent No.: US 8,496,471 B2
(45) Date of Patent: Jul. 30, 2013

(54) PILOT LIGHT GAS LINE CONNECTOR ASSEMBLY

(76) Inventor: Daniel B. Griffith, Avon, CO (US)

(*) Notice: Subject to any disclaimer, the term of this patent is extended or adjusted under 35 U.S.C. 154(b) by 579 days.

(21) Appl. No.: 12/773,298

(22) Filed: May 4, 2010

(65) Prior Publication Data

US 2011/0275022 A1    Nov. 10, 2011

(51) Int. Cl.
*C10L 10/00*    (2006.01)

(52) U.S. Cl.
USPC ............... 431/3; 431/32; 431/121; 15/405; 15/406; 134/22.12; 285/133.11; 285/133.3; 285/133.4

(58) Field of Classification Search
USPC ............... 431/3, 32; 285/31, 119, 133.11, 285/133.3, 133.4, 386; 15/405, 406; 134/22.12
See application file for complete search history.

(56) References Cited

U.S. PATENT DOCUMENTS

| | | | | |
|---|---|---|---|---|
| 302,343 A * | 7/1884 | Kitton | | 285/356 |
| 396,080 A * | 1/1889 | Gilliam | | 285/332 |
| 620,265 A * | 2/1899 | Windle | | 285/45 |
| 826,678 A * | 7/1906 | Marks | | 285/238 |
| 1,115,912 A * | 11/1914 | Dodson | | 285/32 |
| 1,182,360 A * | 5/1916 | Dies | | 285/133.4 |
| 1,255,562 A * | 2/1918 | Olson | | 285/133.4 |
| 1,291,602 A * | 1/1919 | Murray | | 285/133.4 |
| 1,497,396 A * | 6/1924 | Wry | | 29/530 |
| 1,638,546 A * | 8/1927 | Murray | | 285/416 |
| 1,648,026 A * | 11/1927 | Murray | | 285/416 |
| 1,791,121 A * | 2/1931 | Cowles | | 285/341 |
| 1,804,290 A * | 5/1931 | Tschappat | | 285/12 |
| 1,811,501 A * | 6/1931 | Holmes | | 285/405 |
| 1,883,273 A * | 10/1932 | Zerk | | 138/41 |
| 2,084,207 A * | 6/1937 | Lindquist et al. | | 285/148.7 |
| 2,470,499 A * | 5/1949 | Lapp | | 285/45 |
| 2,480,034 A * | 8/1949 | Lapp | | 285/333 |
| 2,694,022 A * | 11/1954 | Schreiner | | 134/24 |
| 2,805,871 A * | 9/1957 | Hammon | | 285/18 |
| 2,818,110 A | 12/1957 | Rulseh | | |
| 3,091,483 A * | 5/1963 | Hruby, Jr. | | 285/95 |
| 3,381,896 A | 5/1968 | Winters | | |
| 3,845,779 A * | 11/1974 | Greene, Jr. | | 137/209 |
| 4,043,741 A | 8/1977 | Moss | | |
| 4,338,793 A * | 7/1982 | O'Hern, Jr. | | 62/292 |
| 4,467,136 A * | 8/1984 | Wium | | 174/50 |
| 4,537,426 A * | 8/1985 | Carter, Sr. | | 285/110 |
| 4,604,050 A | 8/1986 | Henriksson | | |
| 4,671,230 A * | 6/1987 | Turnipseed | | 123/198 A |
| 4,702,754 A | 10/1987 | Blocker | | |
| 4,784,170 A * | 11/1988 | Romanelli et al. | | 134/113 |

(Continued)

*Primary Examiner* — Kenneth Rinehart
*Assistant Examiner* — Jorge Pereiro
(74) *Attorney, Agent, or Firm* — Leyendecker and Lemire; Kurt Leyendecker

(57) ABSTRACT

Pilot light gas line connector assemblies and methods for cleaning a pilot light orifice are disclosed herein. An exemplary connector assembly for coupling to a pilot light gas line and cleaning a pilot orifice has a first fitting end, a second fitting end, and a passageway therebetween. The first fitting end is adapted to receive a first end of the pilot light gas line and the second fitting end is adapted to receive a valve capable of directing forced air from a forced air source into the second fitting end. Methods of cleaning a pilot orifice of a pilot light system include removing the pilot light gas line from a gas port and coupling the pilot light gas line to a pilot light gas line connector assembly. Then forced air is directed into the connector assembly and through the pilot light gas line, thereby cleaning the pilot orifice.

20 Claims, 8 Drawing Sheets

U.S. PATENT DOCUMENTS

| | | | |
|---|---|---|---|
| 4,893,846 A * | 1/1990 | McGraw | 285/133.4 |
| 5,022,364 A * | 6/1991 | Phillips | 123/198 A |
| 5,269,171 A | 12/1993 | Boyer | |
| 5,503,683 A * | 4/1996 | Butcher et al. | 134/22.12 |
| 5,530,988 A * | 7/1996 | McQuillan | 15/406 |
| 5,681,058 A * | 10/1997 | Hwang | 285/133.4 |
| 6,071,355 A * | 6/2000 | Suratt | 134/21 |
| 6,245,160 B1 | 6/2001 | Burns, Jr. | |
| 6,488,318 B1 * | 12/2002 | Shim | 285/322 |
| 6,539,961 B1 | 4/2003 | Tunney | |
| 6,561,810 B1 * | 5/2003 | Schellhardt et al. | 434/126 |
| 6,651,777 B2 * | 11/2003 | Suratt | 184/1.5 |
| 6,668,931 B1 | 12/2003 | Tomlinson | |
| 6,745,591 B1 * | 6/2004 | Lin | 62/292 |
| 7,198,057 B2 * | 4/2007 | Zhurin et al. | 137/240 |
| 7,591,648 B2 | 9/2009 | Mosiewicz | |
| 7,837,769 B2 * | 11/2010 | Lahr | 95/266 |
| 8,286,433 B2 * | 10/2012 | Piper et al. | 60/742 |
| 2003/0079943 A1 * | 5/2003 | Suratt | 184/1.5 |
| 2003/0102663 A1 * | 6/2003 | Chu | 285/23 |
| 2004/0129311 A1 * | 7/2004 | Courtney | 137/223 |
| 2006/0281033 A1 | 12/2006 | Reale | |
| 2007/0001447 A1 * | 1/2007 | Fennington, Jr. | 285/133.11 |
| 2009/0107147 A1 * | 4/2009 | Piper et al. | 60/738 |
| 2009/0133579 A1 * | 5/2009 | Lahr | 95/266 |

* cited by examiner

US 8,496,471 B2

PILOT LIGHT GAS LINE CONNECTOR ASSEMBLY

FIELD OF THE INVENTION

The present invention relates generally to fluid line connector assemblies. More particularly, the present invention relates to pilot light gas line connector assemblies and methods of cleaning pilot orifices.

BACKGROUND

Many gas appliances utilize pilot light systems, which typically include a valve or regulator that controls the output of the main gas line as well as provide a reduced gas pressure for the pilot light gas line. A pilot orifice provides the egress point from which gas leaves the pilot light gas line and is ignited into a flame. Many pilot light systems utilize a continuous flame emitted from the pilot orifice, while other systems are designed to ignite the pilot light sometime prior to the required output from the main gas line. Additionally, many commercial gas appliances (e.g., commercial boilers) use separate pressure regulators for the pilot light gas line as well as separate solenoid or mechanism to start and stop the flow of gas to the pilot light assembly. Nevertheless, a pilot flame typically burns for a substantial and/or continuous period of time during the time the gas appliance is actively being used as well as when the output of the main gas line is shut off by the valve or regulator.

The most common cause for failure of a gas appliance is a malfunctioning pilot light. Moreover, the most common cause for a malfunctioning pilot light is a partially or wholly blocked pilot orifice. Pilot orifices are very small apertures that were typically round, but in more recent designs are generally rectangular. After time white ash from sulfur and gas impurities deposit in and around the pilot orifice causing it to be blocked. When no flame is capable of being emitted from the pilot orifice, the pilot light system and the entire gas appliance malfunction requiring a service call to fix the problem.

The result is many costly service calls that take a significant amount of repair time because a traditional method of cleaning the pilot orifice is to use a tip tool having several thin elongated shafts of different sizes and diameters. Using a tip tool required the service technician to gain access to the pilot light assembly where the pilot orifice exists. Gaining access to the pilot orifice usually requires the technician to take apart a significant portion of the pilot light system and appliance in general. Once access has been gained, one of the thin elongated shafts of the tip tool is pushed through the blocked pilot orifice to clear the impediments blocking it.

In addition to the significant amount of time required for this repair technique, if the wrong tip/thin elongated shaft is used, the pilot orifice becomes damaged or deformed (typically enlarged) and thereby changes the engineering design of the pilot light system to the overall detriment of the gas appliance. This concern is greatly enhanced due to the aforementioned recent change in pilot orifice shape from round to rectangular. Most repair technicians only possess older tip tools having round elongated shafts, which when used with rectangular orifices significantly deforms the pilot orifice.

Heretofore, an improved tool and method for cleaning pilot orifices that can reduce the time necessary for a service call as well as avoid damaging the pilot light system remains a long felt need of service technicians who repair the many gas appliances utilized in home and commercial dwellings around the world.

DETAILED DESCRIPTION

Figure 1:
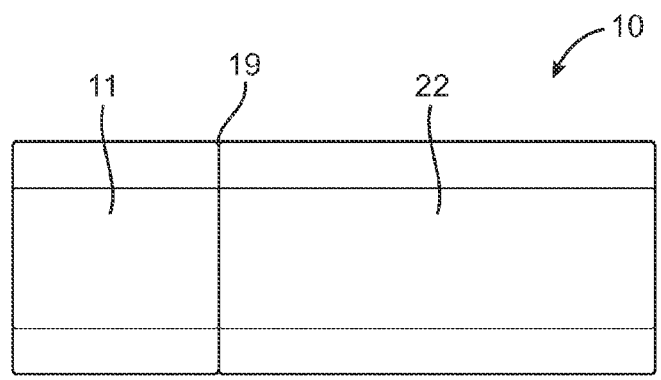
FIG. 1 is a plan view of a pilot light gas line connector assembly according to a first embodiment.

Embodiments of the present invention comprise pilot light gas line connector assemblies and methods of cleaning a pilot orifice. The main connector assembly fitting typically comprises at least two fitting ends adapted to couple to additional components. A first fitting end is adapted to couple to a first end of a pilot light gas line. The first end of the pilot light gas line typically includes a breakaway ferrule fitting coupled to the gas line. A second fitting end is adapted to couple to a valve adapted to direct forced air into the main connector assembly fitting. A passageway between each fitting end of the main connector assembly and within the interior of the connector assembly is substantially airtight to allow air to be forced through the connector assembly, the pilot light gas line, and out of a pilot orifice of the pilot light gas line.

In some embodiments, a third fitting end exists and is adapted to receive a gauge. The gauge is adapted to measure the air pressure of the substantially closed system comprising the connector assembly and the pilot light gas line. The addition of the gauge can be advantageous to adjust and control the air pressure applied to the gas line and out of the pilot orifice in pilot light systems and gas delivery systems that have very precise engineering designs. Hence, applying too much forced air can be avoided if in such instances, it may undesirably alter the engineering design (e.g., inadvertently increase the size or shape of the pilot orifice if the pilot light end cap is comprised of softer metal). It is to be appreciated that some embodiments of the connector assembly can comprise solely of a main fitting with a plurality of fitting ends, while other embodiments can comprise the main fitting and additional components coupled thereto.

In use, embodiments of the pilot light gas line connector assembly are operatively coupled (typically by threaded engagement) to the first end of the pilot light gas line. The first end of the pilot light gas line is removed from a gas delivery port to which it is connected during normal operations of the pilot light system. Forced air is then used to clean a pilot orifice at a second end of the pilot light gas line of any ash residue or debris of any kind. A major advantage of this method is that access to the actual pilot orifice is not required during the repair and it is almost always much easier to gain access to the valve or regulator than to disassemble the gas appliance to gain access to the pilot orifice or enough space to use a tip tool. As a result, the methods and use of embodiments of pilot light gas line connector assemblies significantly reduce the time required to complete a service call.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning: either or both.

References in the specification to "one embodiment", "an embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

The term "removable," "removably coupled," "readily removable," "threadably coupled," and similar terms, as used in this specification and appended claims, refer to structures that can be uncoupled from an adjoining structure with relative ease (i.e., non-destructively and without complicated or time consuming process), and can also be readily reattached or coupled to the previously adjoining structure.

Directional and/or relationary terms such as, but not limited to, left, right, top, bottom, vertical, horizontal, back, front and lateral are relative to each other and are dependent on the specific orientation of an applicable element or article, and are used accordingly to aid in the description of the various embodiments and are not necessarily intended to be construed as limiting.

As applicable, the terms "about" and "generally" as used herein unless otherwise indicated mean a margin of +−20%. Also, as applicable, the term "substantially" as used herein unless otherwise indicated means a margin of +−10%. Concerning angular measurements, "about" or "generally" refer to +−10 degrees and "substantially" refers to +−5.0 degrees unless otherwise indicated. It is to be appreciated that not all uses of the above terms are quantifiable such that the referenced ranges can be applied.

The term "gas" as used in this specification and the appended claims, unless clearly intended otherwise, refers generally to any fluid that has neither independent shape nor volume, and may include a combustible gas or gaseous mixture such as, but not limited to, natural gas and propane.

A First Embodiment Connector Assembly

Figure 2:
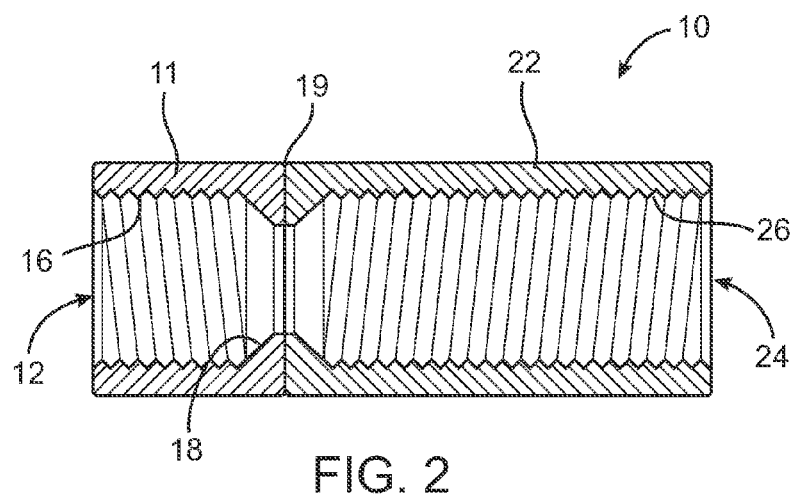
FIG. 2 is a longitudinal cross-section view of a pilot light gas line connector assembly according to a first embodiment.
Figure 3:
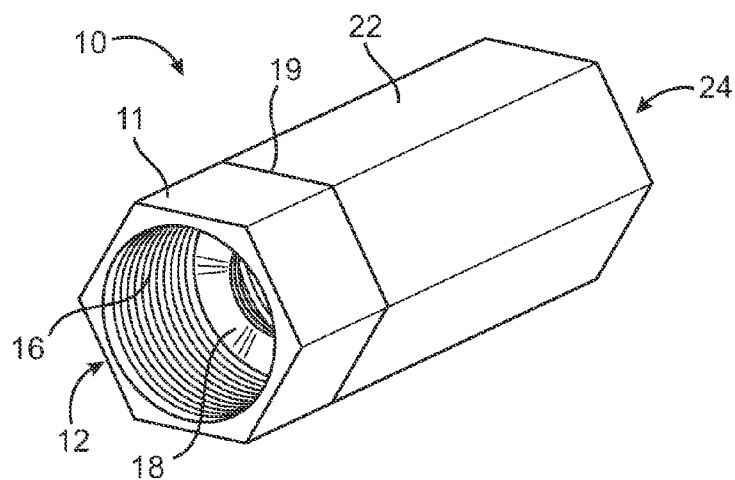
FIG. 3 is a perspective view of a pilot light gas line connector assembly according to a first embodiment.

A first embodiment pilot light gas line connector assembly 10 is illustrated in FIGS. 1-3. The connector assembly 10 can comprise two fitting bodies: a first fitting body 11, a second fitting body 22, and a passageway therethrough. However, it is to be appreciated that embodiments of the connector assembly 10 can comprise a single fitting with ends adapted to receive other components for coupling to a pilot light gas line and cleaning a pilot orifice. Also, it is pertinent to note that first embodiment pilot light gas line connector assembly 10 could be considered a main connector assembly fitting when utilized with other components to create various embodiments of the pilot light gas line connector assembly.

The first fitting body 11 has a first fitting end 12 and is generally tubular having a first exterior surface and a first diametral interior surface. A first opening of the first fitting end 12 is adapted to receive a first end of the pilot light gas line. The first end of the pilot light gas line will be described later in this specification. Female threads 16 are disposed along the first diametral interior surface and provide internal circumferential threading for the first fitting body 11. The female threads 16 start proximal the first opening of the first fitting end 12 and extend to a circumferentially tapered seat portion 18. The circumferentially tapered seat portion 18 has a larger diameter proximal the first opening of the first fitting end 12 and smaller diameter distal the first opening first fitting end 12.

The first fitting body 11 can comprise a ¼ inch compression nut. In one embodiment, the ¼ inch compression nut is similar to the standard fitting used for the pilot gas output of a standard standing pilot gas valve capable of receiving a breakaway ferrule. It is also pertinent to note that the ¼ inch compression nut is used in the connector assembly 10 in an inverted configuration or fashion than the typical normal use of ¼ inch compression nut in coupling tubing sections with respect to the flow of the fluid or gas and receiving of adjacent elements. Additionally, the first exterior surface of the first fitting body 11 is typically hexagonal, or at least a portion thereof is hexagonal to accommodate standard wrenches and tools.

The second fitting body 22 has a second fitting end 24 and is similarly generally tubular having a second exterior surface and a second diametral interior surface. A second opening of the second fitting end 24 is adapted to receive a valve capable of directing forced air from a forced air source into the second fitting end 24. Female threads 26 are disposed along the second diametral interior surface and provide internal circumferential threading for the second fitting body 22. The female threads 26 start proximal the second opening of the second fitting end 24 and extend proximal the second opening a distance into the second fitting end 24. The distance into the second fitting end 24 can be the entire length of the second fitting body 22 or may be only a small portion of the way into the second diametral interior surface from the second fitting end 24. In some implementations, the second fitting body 22 can comprise a circumferentially tapered seat portion, but it is not necessary to the operation of the connector assembly 10 whereas the circumferentially tapered seat portion 18 of the first fitting body 12 is necessary to many embodiments of the pilot light gas line connector assemblies described throughout this specification.

The second fitting body 22 can comprise a ⅛ inch NPT coupler. In one embodiment, the ⅛ inch NPT coupler can comprises female threads with opposite rotations and meeting in the approximate center thereof. Other size and shape pipe/tube couplers are contemplated in various embodiments such as, but not limited to, a ¼ inch NPT coupler. Additionally and similar to the first fitting body 11, the second exterior surface of the second fitting body 22 is typically hexagonal, or at least a portion thereof is hexagonal to accommodate standard wrenches and tools. The first fitting body 11 and the second fitting body 22 can be secured or connected together creating a seam 19 between the two fitting bodies. As best illustrated with reference to FIG. 2, an end (adjacent to and left of the seam 19) distal the first fitting end 12 of the first fitting body 11 can be secured to or connected to an end (adjacent to and right of the seam 19) distal the second fitting end 24 of the second fitting body 22. The end (adjacent to and left of the seam 19) distal the first fitting end 12 of the first fitting body 11 has an opening therethrough, and the end (adjacent to and right of the seam 19) distal the second fitting end 24 of the second fitting body 22 similarly has an opening therethrough whereby the passageway extends from the first opening of the first fitting end 12 to the second opening of the second fitting end 24. It is pertinent to not that the threading and interface related to the end (adjacent to and right of the seam 19) distal the second fitting end 24 of the second fitting body 22 is not important to the connector assembly 10 as a whole, but rather that the end has the opening therethrough.

The passageway operatively couples the first fitting end 12 and the second fitting end 24 to allow air and/or other fluids to pass through the connector assembly 10. Because forced air will pass through the connector assembly 10 during operation while connected to pilot light gas lines and cleaning pilot orifices, the passageway is substantially, if not completely, airtight.

A Second Embodiment Connector Assembly

Figure 4:
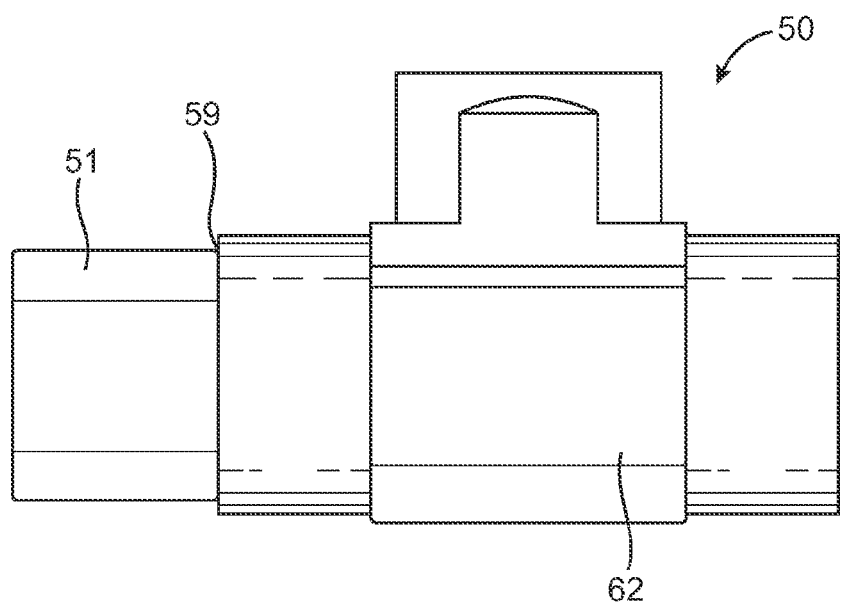
FIG. 4 is a plan view of a pilot light gas line connector assembly according to a second embodiment.
Figure 5:
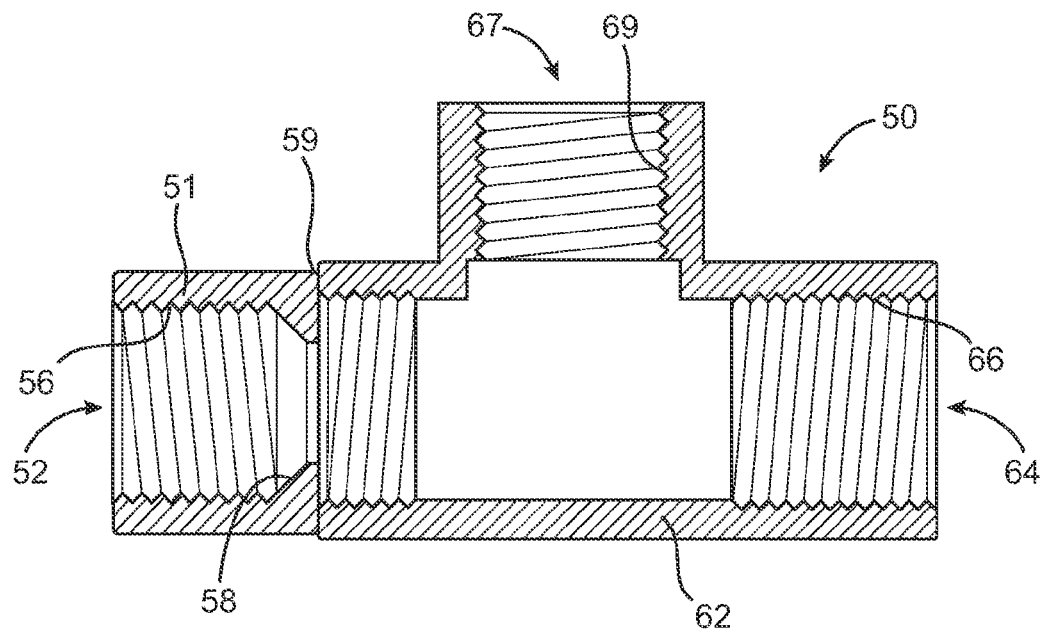
FIG. 5 is a longitudinal cross-section view of a pilot light gas line connector assembly according to a second embodiment.
Figure 6:
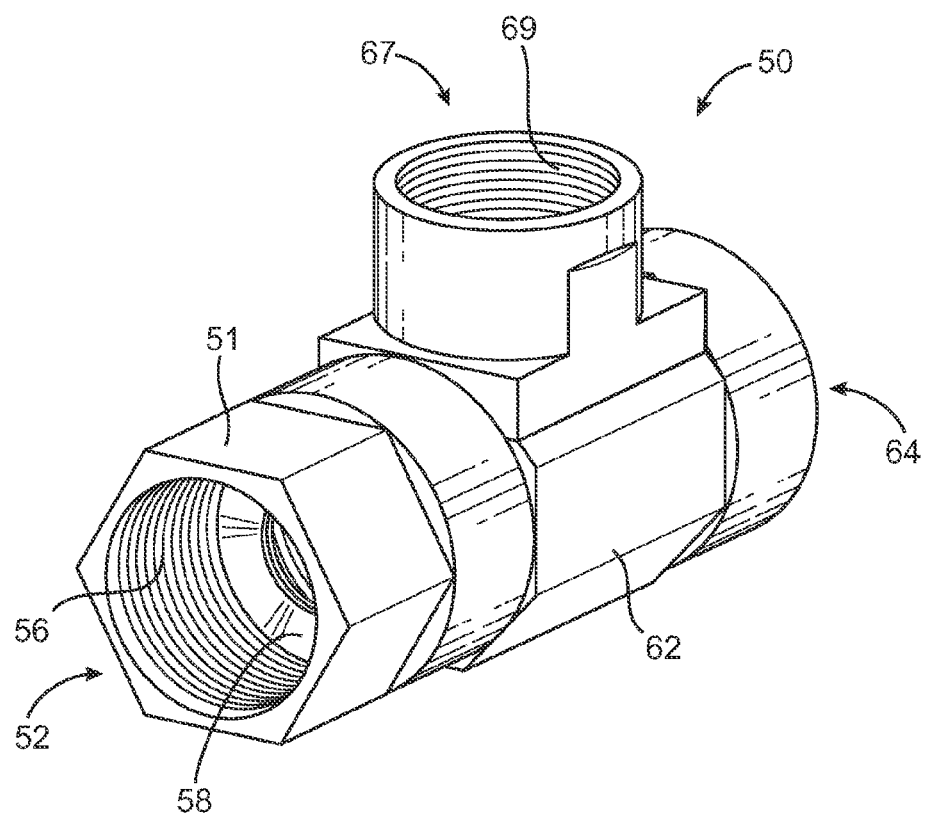
FIG. 6 is a perspective view of a pilot light gas line connector assembly according to a second embodiment.

A second embodiment pilot light gas line connector assembly 50 is illustrated in FIGS. 4-6. Similar to the first embodiment, the second embodiment pilot light gas line connector assembly 50 can comprise two fitting bodies: a first fitting body 51, a second fitting body 62, and a passageway therethrough. While the first fitting body 51 is similar to that in the first embodiment, the second fitting body 62 includes additional openings and fitting ends adapted to receive several other components for use with coupling to the pilot light gas line and cleaning the pilot orifice. The second embodiment pilot light gas line connector assembly 50 could be considered a main connector assembly fitting when utilized with other components to create various embodiments of the pilot light gas line connector assembly.

The first fitting body 51 of the second embodiment pilot light connector assembly 50 has a first fitting end 52 and is generally tubular having a first exterior surface and a first diametral interior surface. A first opening of the first fitting end 52 is adapted to receive the first end of the pilot light gas line. Female threads 56 are disposed along the first diametral interior surface and provide internal circumferential threading for the first fitting body 51. The female threads 56 start proximal the first opening of the first fitting end 52 and extend to a circumferentially tapered seat portion 58. The circumferentially tapered seat portion 58 has a larger diameter proximal the first opening of the first fitting end 52 and smaller diameter distal the first opening first fitting end 52.

Like the first embodiment, the first fitting body 51 of the second embodiment connector assembly 50 can comprise an inverted ¼ inch compression nut. In one embodiment, the ¼ inch compression nut is similar to the standard fitting used for the pilot gas output of a standard standing pilot gas valve. Again, it is also pertinent to note that the ¼ inch compression nut is used in the connector assembly 50 in an inverted configuration or fashion than the typical normal use of ¼ inch compression nut in coupling tubing sections with respect to the flow of the fluid or gas and receiving of adjacent elements. Additionally, the first exterior surface of the first fitting body 51 is typically hexagonal, or at least a portion thereof is hexagonal to accommodate standard wrenches and tools.

The second fitting body 62 of the second embodiment pilot light gas line connector assembly 50 has a second fitting end 64 and that is generally tubular having a second exterior surface and a second diametral interior surface. A second opening of the second fitting end 64 is adapted to receive a valve capable of directing forced air from a forced air source into the second fitting end 64. Female threads 66 are disposed along the second diametral interior surface and provide internal circumferential threading for the second fitting body 62. The female threads 66 start proximal the second opening of the second fitting end 64 and extend proximal the second opening a distance into the second fitting end 64 to an internal cavity of the second fitting body 62. The distance into the second fitting end 64 is typically only a portion of the way into the second diametral interior surface from the second fitting end 64 toward the internal cavity of the second fitting body 62.

A third fitting end 67 is included in the second fitting body 62 of the second embodiment pilot light gas line connector assembly 50. The third fitting end 67 is generally tubular having a third exterior surface and a third diametral interior surface. A third opening of the third fitting end 67 is adapted to receive an end of a gauge capable of measuring the applied air pressure. Female threads 69 are disposed along the third diametral interior surface and provide internal circumferential threading for the third fitting end 67 of the second fitting body 62. The female threads 69 start proximal the third opening of the third fitting end 67 and extend proximal the third opening a distance into the third fitting end 67 to the internal cavity of the second fitting body 62. The distance into the third fitting end 67 is typically only a portion of the way into the third diametral interior surface from the third fitting end 67 toward the internal cavity of the second fitting body 62.

The second fitting body 62 of the second embodiment connector assembly 50 can comprise a ⅛ inch NPT tee fitting. Other size and shape pipe/tube tee fittings are contemplated in various embodiments such as, but not limited to, a ¼ inch NPT tee fitting. While the second and third exterior surfaces of the second fitting body 62 may include a hexagonal portion, they are more typically cylindrical. The first fitting body 51 and the second fitting body 62 of the second embodiment connector assembly 50 can be secured or connected together creating a seam 59 between the two fitting bodies.

As best illustrated with reference to FIG. 5, an end (adjacent to and left of the seam 59) distal the first fitting end 52 of the first fitting body 51 can be secured to or connected to an end (adjacent to and right of the seam 59) distal the second fitting end 64 and third fitting end 67 of the second fitting body 62. The end (adjacent to and left of the seam 59) distal the first fitting end 52 of the first fitting body 51 has an opening therethrough, and the end (adjacent to and right of the seam 99) distal the second fitting end 64 and third fitting end 67 of the second fitting body 62 similarly has an opening therethrough whereby the passageway extends from the first opening of the first fitting end 52 to the second opening of the second fitting end 64 and the third opening of the third fitting end 67. It is pertinent to note that the threading and interface related to the end (adjacent to and right of the seam 59) distal the second fitting end 64 of the second fitting body 62 is not important to the connector assembly 50 as a whole (as exemplified in FIG. 5 at seam 59), but rather that the end has the opening therethrough.

The passageway operatively couples the first fitting end 52, the second fitting end 64, and the third fitting end 67 to allow air and/or other fluids to pass through the second embodiment connector assembly 50. Moreover, the third fitting end 67 can be (but in not necessarily) orthogonal in relation to the first fitting end 52 and the second fitting end 64. Because forced air will pass through the connector assembly 50 during operation while connected to pilot light gas lines and cleaning pilot orifices, the passageway is substantially, if not completely, airtight.

It is pertinent to note that a single body fitting as described herein with respect to the first and second embodiment pilot light gas line connector assemblies 10 and 50 does not exist, nor can any suitable replacement be found for its intended purpose of connecting to a pilot light gas line and cleaning a pilot orifice.

The first and second embodiment pilot light gas line connector assemblies 10 and 50 can be comprised of any suitable material such as but not limited to brass, chrome or nickel plated brass, steel, copper, soft iron, aluminum, aluminum alloy, and plastic. An exemplary method of making or assembling the first or second embodiment connector assemblies 10 or 50, as well as other embodiments for that matter, comprises: providing the first fitting body 11 or 51 and the second fitting body 22 or 62. The two fitting bodies are typically secured or connected together as described above by welding the ends adjacent the seam 19 or 59 together. However, in some embodiments of the method of making where the first or second embodiment connector assembly 10 or 50 is comprised of a plastic material, for instance, securing the ends adjacent the seam 19 or 59 will typically comprise adhesively joining or fusing the ends together.

Moreover, other methods of making embodiments of the pilot light gas line connector assembly include making a mold or cast and creating a unitary piece having the various fitting ends and being comprised of the one of the aforementioned materials. It is to be appreciated that some embodiments may comprise one or more fitting bodies as described herein; however, other embodiments may simply comprise the fitting ends. The fitting ends may also be fitting ends on alternative structures not integrated into a fitting body.

The foregoing describes one manner of making or assembling the first and second embodiment pilot light gas line connector assemblies; however, other methodologies and variations on the described methodology are contemplated as would be obvious to one of ordinary skill in the art having the benefit of this disclosure. Moreover, it is pertinent to note that there are no known uses for a connector assembly comprising the first body fitting (11 or 51) and the second fitting body (24 or 64) connected together in the manner and variations described above.

Figure 7:
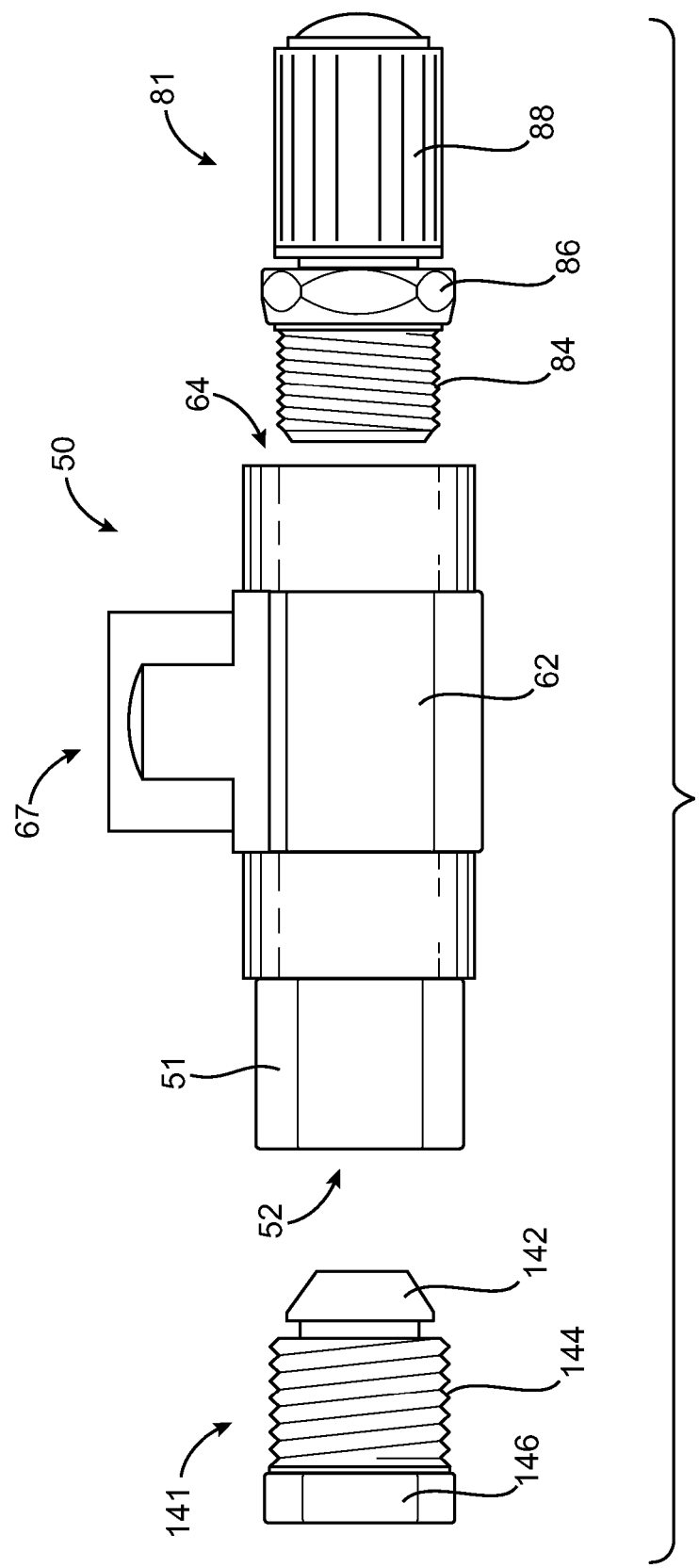
FIG. 7 is a plan view of a pilot light gas line connector assembly including a valve and a fitting for a first end of a pilot light gas line according to an embodiment.

Other Embodiments of Connector Assemblies for Coupling to a Pilot Light Gas Line and Cleaning a Pilot Orifice Other embodiments of connector assemblies comprise adding or combining one or more components to the either the first embodiment connector assembly 10 or the second embodiment connector assembly 50 as a main connector assembly fitting to create a pilot light gas line connector assembly better prepared for cleaning a pilot orifice. For example, FIG. 7 shows the second embodiment connector assembly 50 with a breakaway ferrule fitting 141 representing a first end of the pilot light gas line. The breakaway ferrule fitting 141 comprises a frustoconical tip portion 142, male threads 144 disposed along a breakaway ferrule diametral exterior surface, and a nut portion 146. The breakaway ferrule fitting 141 is adapted to secure and removably couple the first end of the pilot light gas line to the first fitting end 52 of the second embodiment connector assembly 50 as well as other similar end fittings or ports such as those disposed on a gas valve or regulator.

Also shown in FIG. 7 is a valve 81 adapted to be removably coupled to the second fitting end 64 of the second embodiment connector assembly 50. The valve 81 includes a first valve end (under the cap 88), second valve end, and a nut portion 86 disposed therebetween. The first valve end is adapted to couple to a forced air egress port of a forced air source whereas the second valve end is adapted to be removably coupled to the second fitting end 64. Male threads 84 are disposed along a valve diametral exterior surface of the second valve end thereby enabling the valve 81 to be threadably coupled to the second fitting end 64 of the second embodiment connector assembly 50. In an implementation, the valve 81 is a Schrader valve. However, the use of other valves such as, but not limited to, a Presta valve is contemplated.

Figure 8A:
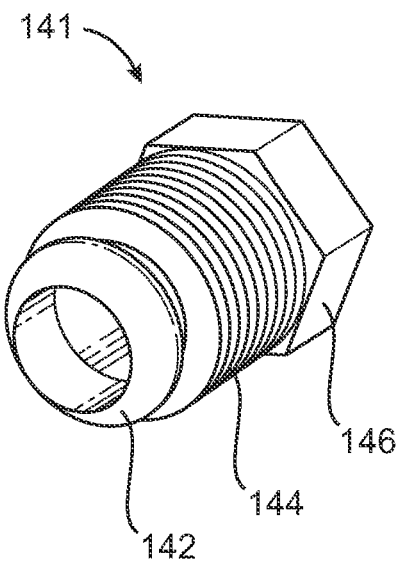
FIG. 8A is close-up perspective view of a fitting for a first end of a pilot light gas line.
Figure 8B:
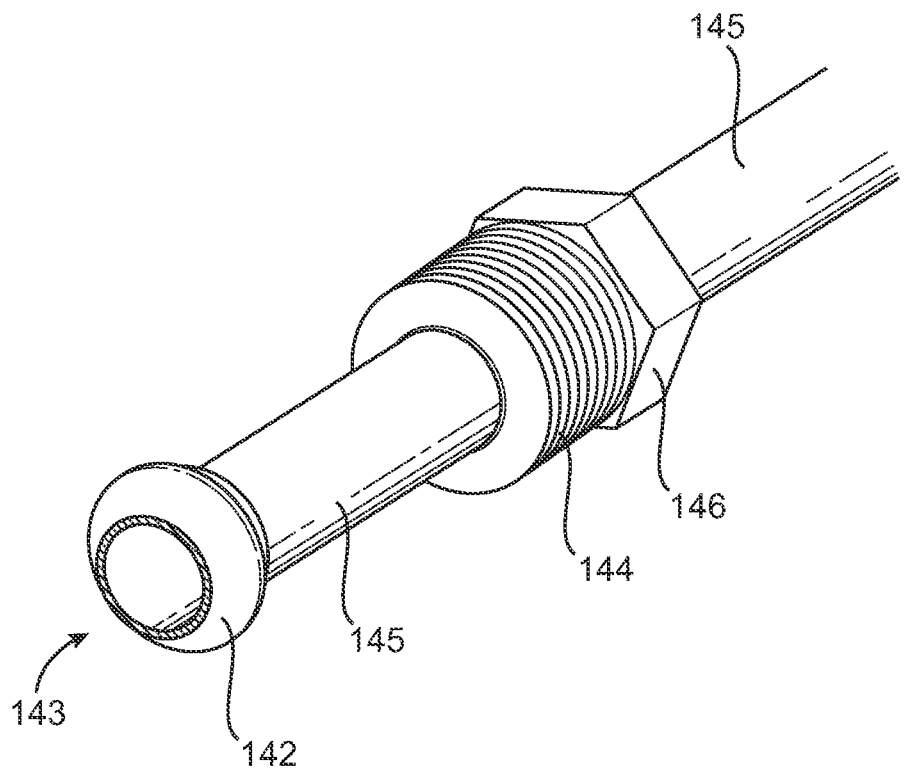
FIG. 8B is close-up perspective view of a fitting for a first end of a pilot light gas line coupled to the pilot light gas line.

A perspective view of the breakaway ferrule fitting 141 is illustrated in FIG. 8A showing an aperture of the frustoconical tip portion 142. FIG. 8B shows the breakaway ferrule fitting 141 in a broken away configuration coupled to a pilot light gas line 145. A gas line opening 143 is formed at the first end of the pilot light gas line 145 where the pilot light gas line 145 is inserted into and coupled to the aperture of the by the frustoconical tip portion 142. A section of the breakaway ferrule 141 comprising the breakaway ferrule diametral exterior surface having male threads 144 and the nut portion 146 is adapted to slide along a portion of the pilot light gas line 145 proximal the first end thereby allowing a tight fitting engagement with the first fitting end 11 or 51 of the first or second embodiment connector assembly 10 or 50. In various implementations, the pilot light gas line 14 can comprise tubing having a ¼ inch, ⅜ inch, ½ inch, ⅝ diameter, as well as 2 millimeter, 4 millimeter, or 8 millimeter standard tubing.

Figure 9:
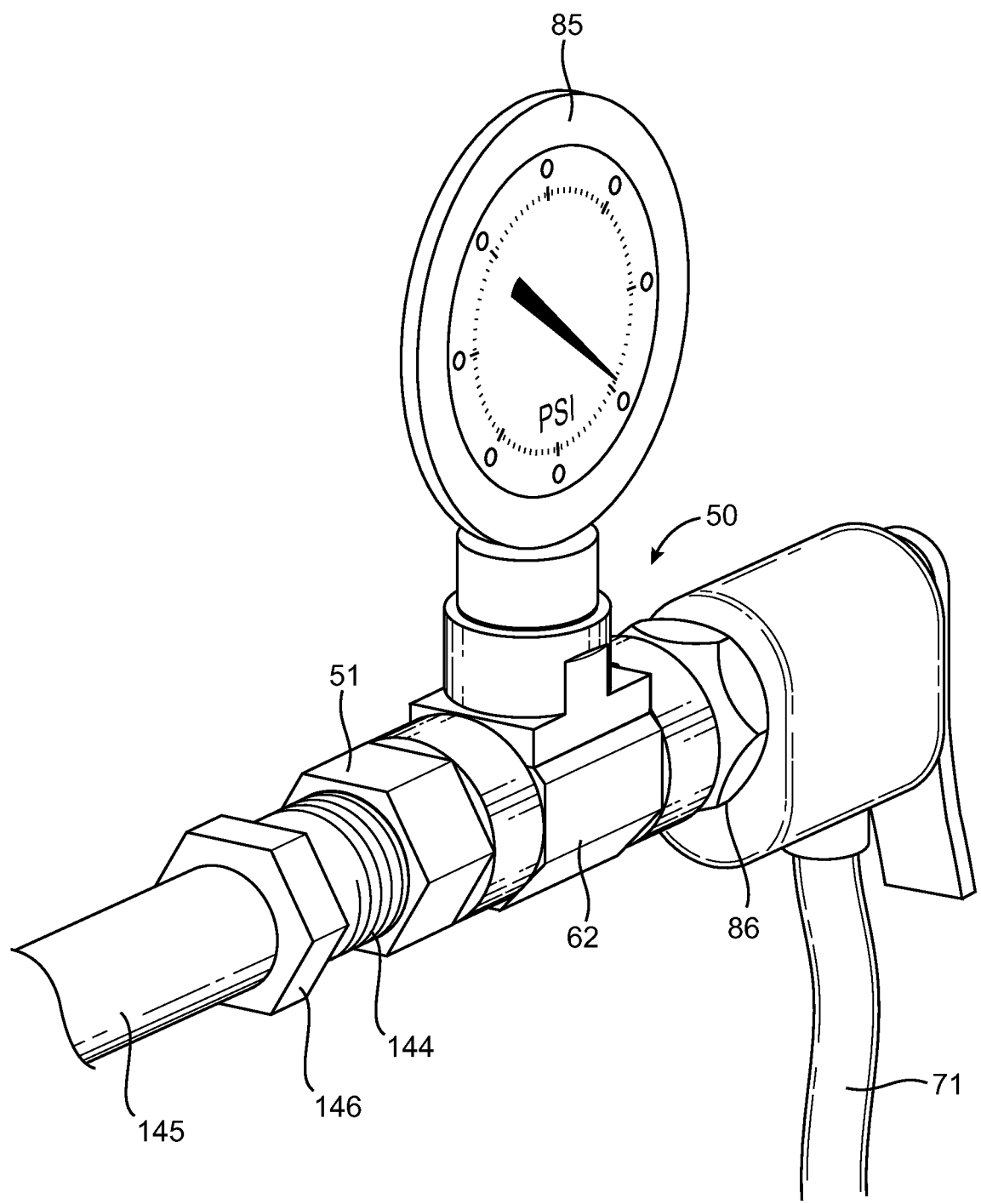
FIG. 9 is a close-up perspective view of a pilot light gas line connector assembly including a forced air egress port coupled to a vale and a first end of a pilot light gas line according to an embodiment.

Now referring to FIG. 9, a pilot light gas line connector assembly is illustrated coupled to the first end of the pilot light gas line 145. The pilot light gas line connector assembly connector assembly includes the second embodiment connector assembly 50, a gauge 85 capable of measuring air pressure, a valve 81, and a forced source having a forced air egress port or line 71. The gauge 85 includes a connection end having male threads disposed along a connection exterior surface that is threadably coupled to the third fitting end 67 of the second embodiment connector assembly 50 (see FIG. 6). The second valve end is threadably coupled to the second fitting end 64 (see FIGS. 6 and 7). The first valve end of the valve 81 is operatively coupled to the forced air egress port or line 71 of the forced air source. The forced air source can be any suitable source to apply forced air into the pilot light gas line connector assembly and through the pilot light gas line 145. In some implementations, the forced air source can be a hand pump, a foot pump, a canned air container, or an air compressor. It is to be appreciated that the canned air container can be one specially made for use in cleaning pilot orifices as described herein or can be standard canned air typically used for other purposes such as dusting and horn blowing, for example.

Figure 10:
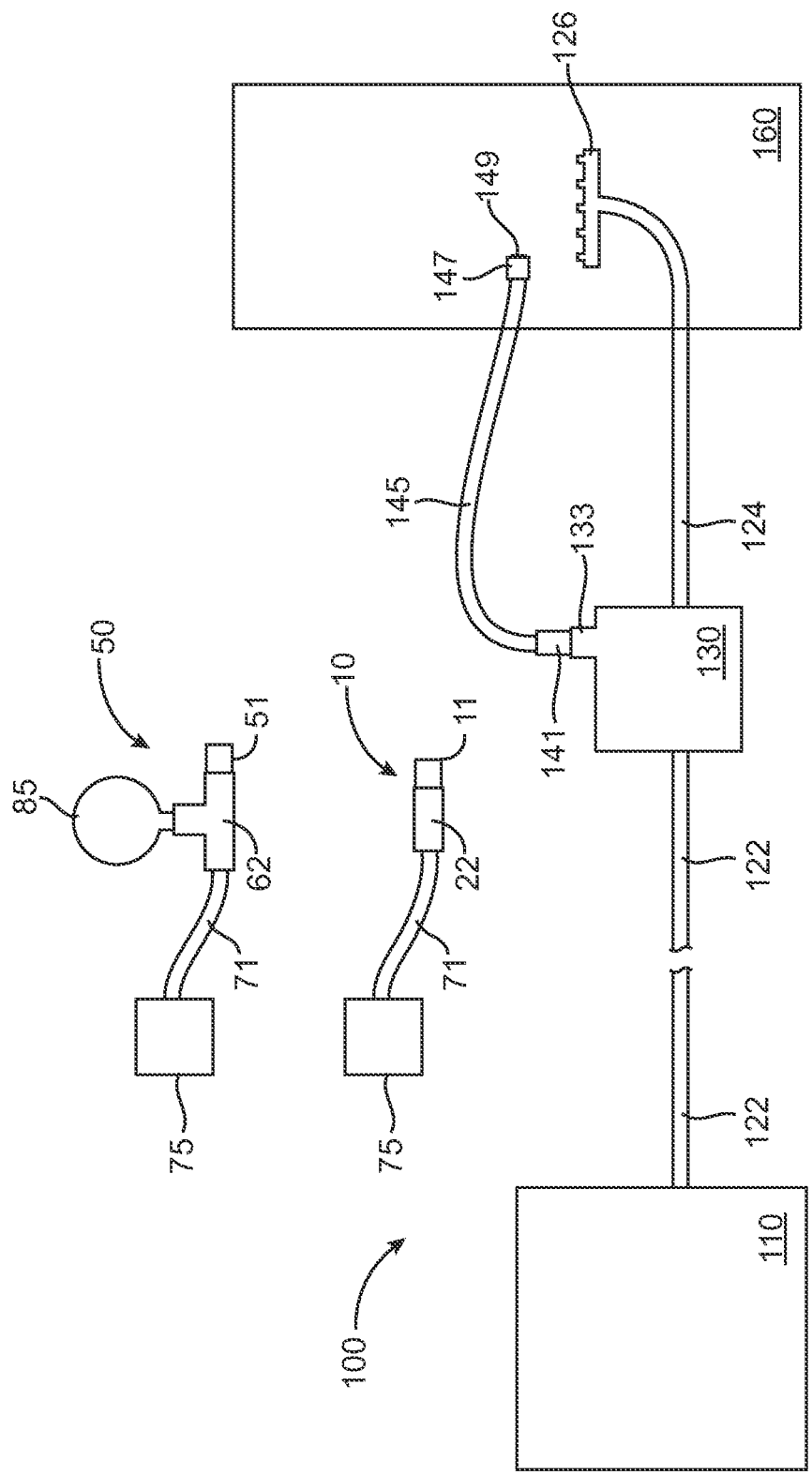
FIG. 10 is an exemplary gas delivery system with a pilot light system and pilot light gas line connector assemblies according to an embodiment.

FIG. 10 is an exemplary gas delivery system with a pilot light system and pilot light gas line connector assemblies according to embodiments. A gas delivery system 100 may comprise a gas source 110 having a main gas line 122. A gas valve or regulator 130 receives gas from the main gas line 122, then provides and controls the gas to a main gas output line 124 and a pilot light system. The main output gas output line 124 provides gas to a burner assembly 126 of a gas appliance 160. The gas appliance 160 can be any number of appliances using gas and having pilot light systems (e.g., systems using standing pilot lights and some hot surface igniters) such as, but not limited to, water heaters, furnaces, boilers, and fireplaces.

A regulated amount of gas for the pilot light system is dispensed out a gas delivery port or pilot gas output 133. The first end 141 of the pilot light gas line 145 is removably coupled to the gas delivery port 133. A second end 147 of the pilot light gas line 145 includes a pilot orifice 149. When cleaning a fully or partially blocked pilot orifice 149, the first end 141 of the pilot light gas line 145 is removed from the gas delivery port 133 and coupled to the first fitting body (11 or 51) of the first or second embodiment connector assembly 10 or 50. The forced air source 75 is operatively coupled to the second fitting body (22 or 62) via the forced air egress port or line 71. Thus, when the forced air source is caused to apply air into the first or second embodiment connector assembly 10 or 50 connector assembly, forced air is sent through the pilot light gas line 145 and expelled out the pilot orifice 149 with significant force clearing it of any ash, impurities, or debris of any kind.

An Exemplary Method of Cleaning a Pilot Orifice with a Pilot Light Gas Line Connector Assembly A new and useful exemplary method of cleaning a malfunctioning pilot light that does not require access to the pilot orifice itself is disclosed herein. It is to be understood that various embodiments of the pilot light gas line connector assembly can be used in conjunction with exemplary method. For example, either the first embodiment pilot light gas line connector assembly 10 or the second embodiment pilot light gas assembly 50 illustrated and described in detail above may be utilized in method 200.

A first operation (block 205) comprises disconnecting a first end of a pilot light gas line from a gas delivery port. The gas delivery port typically, but not necessarily, is disposed on a pilot light valve or regulator. The pilot light valve or regulator provides a regulated amount of gas leaving the gas delivery port to be used for pilot light operation. It is pertinent to the note that the method 200 requires shutting down the pilot light system to make the specific repair. Therefore, method 200 cannot and should not be performed in situ of in-line with the pilot light system and/or the gas delivery system in general.

Next, a solution can be added into an opening of the first end of a pilot light gas line (block 210). The solution can be any suitable compound or mixture adapted to clean pilot orifices. In certain implementations, the solution comprises water, alcohol, or a mixture of both.

Next, as described in block 215, a first end of a connector assembly is coupled to the first end of the pilot light gas line. Typically, this will be accomplished by turning a one of the connector assembly and the first end of the pilot light gas line. The first end of connector assembly can be threadably coupled to the first end of the pilot light gas line. A breakaway ferrule will typically comprise the first end of the pilot light gas line. The breakaway ferrule can be securely coupled with the creating an airtight or near airtight coupling with the connector assembly.

A next operation (block 220) comprises coupling a forced air source into a second end of the connector assembly. The forced air source can be a hand pump, foot pump, or a compressor. In some embodiments, the forced air source is coupled directly to the second end of the connector assembly, but more typically a valve is threadibly coupled to the second end of the connector assembly and an air egress end of the forced air source is coupled to the valve.

Next, a gauge is coupled to a third end of the connector assembly (block 225). The gauge can be any type of air pressure gauge adapted to measure the air pressure in the pilot light gas line. Mechanical and electrical/mechanical air pressure gauges, and the like are contemplated for use with embodiments of the connector assembly.

A next operation (block 230) comprises causing the forced air source to apply air into the connector assembly through the pilot light gas line and out a pilot orifice. A user causes the forced air source to apply air depending on the type of forced air source utilized. For example, if the forced air source is a hand pump, such as one for inflating balls and tires, then the hand pump will be caused to apply air by the user moving the handle or lever to cause air to be forced out the air egress end.

The gauge can be read to determine if a proper amount of air pressure is flowing through the pilot light gas line. Typically, anywhere between 20 to 80 lbs of air pressure may be required to clean or clear an obstructed pilot orifice. This amount of air pressure can be upwards of 300 times the typical gas pressure that typically exists in the pilot light gas line and exits of a pilot orifice. In some instances, it is advantageous view the gauge to ensure an appropriate amount of air pressure is being applied to the pilot light gas line and pilot orifice as to not damage the pilot orifice or other elements in the pilot light system and/or gas delivery system in general. Moreover, it is pertinent to note that the amount of air pressure required to clean or clear a blocked pilot orifice is typically much greater than that which can be performed by a human being by blowing into the first end of the pilot light gas line.

Figure 11:
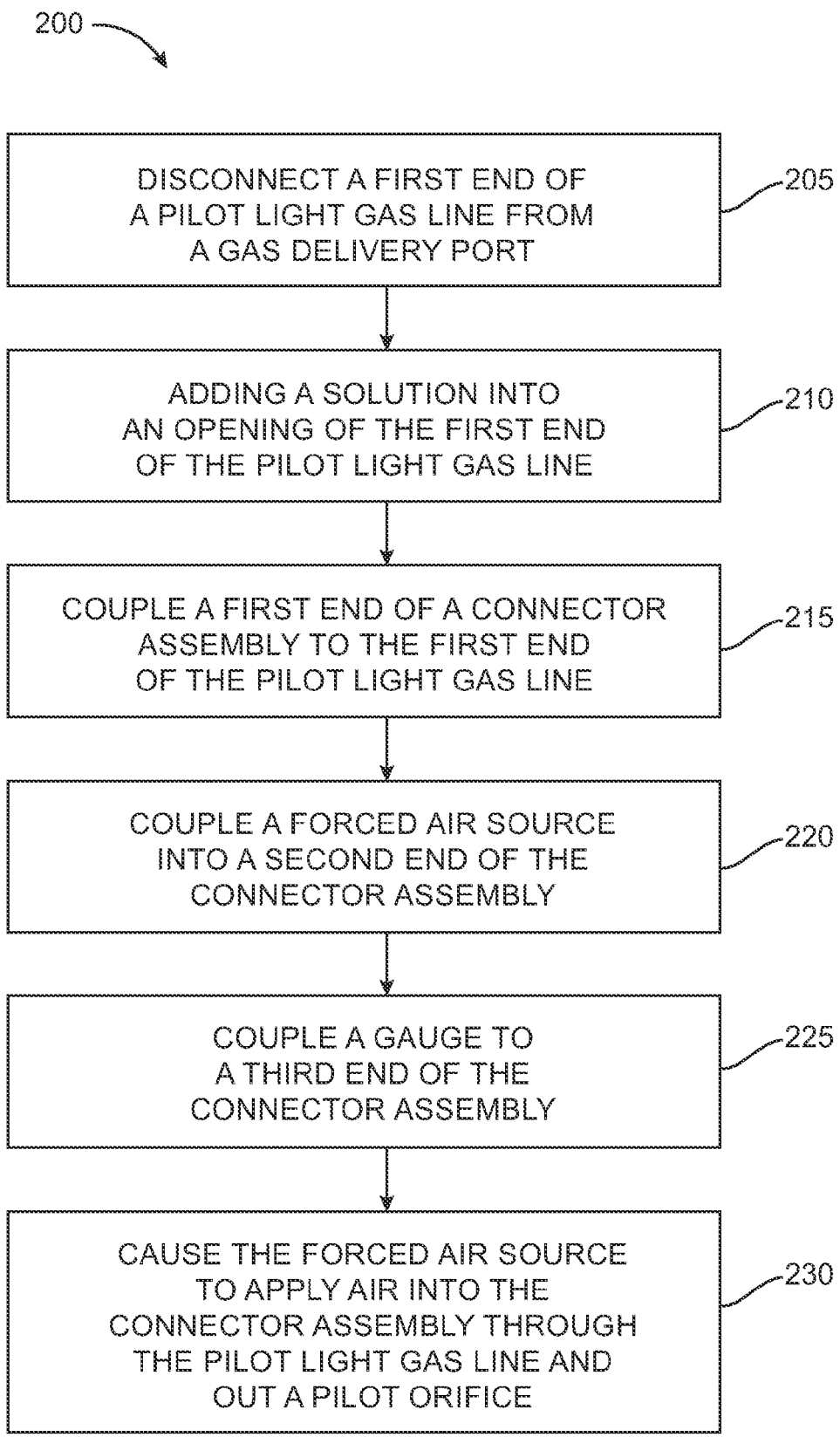
FIG. 11 is a flow chart of an exemplary method for cleaning a pilot orifice of a pilot light gas line according to an embodiment.

It is to be understood that adding the solution as described in block 210 can be added to other openings and still remain within the scope and spirit of the exemplary method 200 of cleaning a pilot orifice. For example, the first end of the connector assembly can be coupled to the first end of the pilot light gas line and the solution be added to an opening in the second or third end of the connector assembly. Similarly, the operations identified in the blocks of the flow chart illustrated in FIG. 11 are not required to be performed in any specific order and are designated for ease of understanding embodiments of the invention Moreover, some operations described in the method 200 may not be necessary given the number of fitting ends in the embodiment of the connector assembly used with the method 200. For instance, the operation described in block 225 need not (and cannot) be performed when the connector assembly utilize is a first embodiment connector assembly 10.

Alternative Embodiments and Variations

The various embodiments and variations thereof, illustrated in the accompanying figures and/or described above, are merely exemplary and are not meant to limit the scope of the invention. It is to be appreciated that numerous other variations of the invention have been contemplated, as would be obvious to one of ordinary skill in the art, given the benefit of this disclosure.

For example, embodiments of the connector assembly and methods of use thereof may be utilized to clean a variety of fluid lines, particularly fluid lines that may include a relatively small orifice for fluid egress. Moreover, it is contemplated that embodiments of the pilot light gas line connector assembly may include combinations with the pilot light gas line to which it connects. For example, an embodiment of inventive concept disclosed herein includes: a combination comprising a pilot light gas line connector assembly and a pilot light gas line, wherein a first fitting end of the pilot light gas line connector assembly is removably coupled to a first end of the pilot light gas line.

Additionally, in most embodiments the valve and/or the gauge is threadably coupled to the main connector assembly. However, in some embodiment the valve and/or the gauge is integrated with the second fitting end and/or the third fitting end respectively.

It is pertinent to note that most embodiments as described above do not contemplate an in situ configuration of the connector assembly, but rather a direct connection to the pilot light gas line. This is due to the fact that air pressure applied in an in situ configuration would typically result in damage to the regulator for which the connector assembly and pilot light gas line would be operatively coupled to in such a configuration.

However, at least one alternative embodiment is contemplated such that the connector assembly includes a backflow stop or stopping mechanism to enable an in situ or in-line configuration. In such a configuration, one fitting of the connector assembly would be adapted to couple to a first end of a gas line, another fitting would be adapted to couple to a valve for applying forced air into the connector assembly and stopping gas from exiting the valve, and one fitting adapted to couple to a gas delivery port of a regulator including a stopping mechanism to be activated when forced air is inserted into the valve. Moreover, if the inventive concept of pilot light gas line were to be directly incorporated into pilot light gas lines and/or output ports for gas valves or regulators, then the various fitting end would be integrated with the adjacent elements of the pilot light system.

All variations of the invention disclosed in this provisional application are intended and contemplated to be within the spirit and scope of the invention.

I claim:

1. A method of cleaning a pilot orifice with a pilot light gas line connector assembly having (i) a first fitting end, the first fitting end having a first exterior surface, a first opening, and a first diametral interior surface, and being adapted to receive a first end of a pilot light gas line, (ii) a second fitting end, the second fitting end having a second exterior surface, a second opening, and a second diametral interior surface, and being adapted to receive a valve capable of directing forced air from a forced air source into the second end, and (iii) a passageway, the passageway operatively coupling the first fitting end and the second fitting end, and being substantially airtight, the method comprising:
disconnecting a first end of the pilot light gas line from a gas delivery port;
coupling the first fitting end of the pilot light gas line connector assembly to the first end of the pilot light gas line; and
causing the forced air source to apply air into the pilot light gas line connector assembly through the pilot light gas line and out a pilot orifice.

2. The method of cleaning a pilot orifice with a pilot light gas line connector assembly recited in claim 1 further comprising:
adding a solution into the first end of the pilot light gas line and the passageway of the pilot light gas line connector assembly.

3. The method of claim 1, wherein the first fitting end includes female threads disposed along the first diametral interior surface extending proximal the first opening to a circumferentially tapered seat portion, the circumferentially tapered seat portion having a larger diameter proximal the first opening and smaller diameter distal the first opening.

4. The method of claim 1, wherein the second fitting end includes female threads disposed along the second diametral interior surface extending proximal the second opening a distance into the second fitting end.

5. The method of claim 4, the connector assembly further comprising:
a valve capable of directing forced air from a forced air source, the valve having a first valve end adapted to couple to a forced air egress port and a second valve end having male threads disposed along a valve diametral exterior surface;
wherein the second valve end is threadably coupled to the second fitting end.

6. The method of claim 5, wherein the valve is a Schrader valve.

7. The method of claim 5, the connector assembly further comprising:
a forced air source, the forced air source having a forced air egress port;
wherein the forced air source is operatively coupled to the first valve end of the valve.

8. The method of claim 7, wherein the forced air source is selected from the group consisting of:
a hand pump;
a foot pump;
a canned air container; and
an air compressor.

9. The method of claim 1, the connector assembly further comprising:
a third fitting end, the third fitting end having a third exterior surface and a third diametral interior surface, and being adapted to receive an end of a gauge;
wherein the passageway is further operatively coupled to the third fitting end.

10. The method of claim 9, wherein the third fitting end includes female threads disposed along the third diametral interior surface extending proximal the third opening a distance into the third fitting end.

11. The method of claim 10, the connector assembly further comprising:
a gauge capable of measuring air pressure, the gauge including a connection end having male threads disposed along a connection exterior surface;
wherein the connection end is threadably coupled to the third fitting end.

12. The method of claim 1, wherein at least a portion of the first exterior surface of the first fitting end is hexagonal.

13. The method of claim 1 further comprising:
measuring an air pressure within the connector assembly and the pilot light gas line.

14. A method of cleaning a pilot orifice with a pilot light gas line connector assembly, the method comprising:
disconnecting a first end of a pilot light gas line from a gas delivery port;
coupling a first fitting body of the connector assembly to the first end of the pilot light gas line; and
causing a forced air source to apply air into the connector assembly through the pilot light gas line and out a pilot orifice;
wherein the connector assembly comprises:
a generally tubular member having an exterior surface and a first diametral interior surface, the generally tubular member including,
a first fitting body having a first end defining a first opening and female threads disposed along the first diametral interior surface extending proximal the first end to a circumferentially tapered seat portion, the circumferentially tapered seat portion having a larger diameter proximal the first end and smaller diameter distal the first end, and a second fitting body having a second end defining a second opening and female threads disposed along the first diametral interior surface starting proximal the second end and extending for at least a distance within the second fitting;

wherein the first end and the second end are disposed generally opposite of each other and a passageway extends from the first opening to the second opening and is defined by the first diametral interior surface.

15. The method of claim 14, wherein (i) the generally tubular member further includes a second diametral interior surface orthogonal to and intersecting the first diametral interior surface, (ii) the second fitting body further comprises a third end defining a third opening and female threads disposed along the second diametral interior surface starting proximal the third end and extending for a distance within the second fitting, and (iii) the second diametral interior surface extends the passageway through the third opening.

16. The method of claim 14 further comprising:
measuring an air pressure within the connector assembly and the pilot light gas line.

17. A method of making the connector assembly of claim 14, the method comprising:
providing the first fitting body;
providing the second fitting body; and
securing an end distal the first end of the first fitting body to an end distal the second end of the second fitting body;
wherein the end distal the first end and the end distal the second end comprise openings whereby the passageway extends from the first opening to the second opening.

18. The method of making the connector assembly recited in claim 17, wherein said providing the first fitting body comprises providing a ¼ inch compression nut.

19. The method of claim 14 further comprising:
adding a solution into the first end of the pilot light gas line and the passageway of the connector assembly.

20. A method of cleaning a pilot orifice with a pilot light gas line connector assembly, the method comprising:
disconnecting a first end of a pilot light gas line from a gas delivery port;
adding a solution into a first end of the pilot light gas line and a passageway of the connector assembly;
coupling a first fitting end of the connector assembly to the first end of the pilot light gas line;
coupling a forced air source to a second end of the connector assembly;
coupling a gauge to a third end of the connector assembly; and
causing the forced air source to apply air into the connector assembly through the pilot light gas line and out a pilot orifice;
wherein the gas delivery port is part of a gas appliance.

* * * * *